United States Patent
Key

(10) Patent No.: US 6,582,638 B1
(45) Date of Patent: Jun. 24, 2003

(54) METHOD OF MAKING GRANULES AND THE GRANULATOR

(75) Inventor: Edward John Key, Nelson (NZ)

(73) Assignee: Crop Care Australasia Pty. Ltd., Pinkenba (AU)

( * ) Notice: Subject to any disclaimer, the term of this patent is extended or adjusted under 35 U.S.C. 154(b) by 0 days.

(21) Appl. No.: 09/600,842

(22) PCT Filed: Jan. 22, 1999

(86) PCT No.: PCT/AU99/00045
§ 371 (c)(1),
(2), (4) Date: Nov. 9, 2000

(87) PCT Pub. No.: WO99/37393
PCT Pub. Date: Jul. 29, 1999

(30) Foreign Application Priority Data

Jan. 23, 1998 (AU) .............................. PP 1483

(51) Int. Cl.⁷ .................. B29C 47/00; B29C 67/08; B28B 21/52
(52) U.S. Cl. .................. 264/118; 264/119; 264/176.1; 264/210.1; 264/210.12; 425/331
(58) Field of Search ................. 264/117, 118, 264/119, 176.1, 210.1, 211.12; 425/331, DIG. 230

(56) References Cited

U.S. PATENT DOCUMENTS

| 2,171,039 | A | * | 8/1939 | Meakin ...................... 425/331 |
| 2,290,752 | A | * | 7/1942 | Hurxthal et al. ............. 425/331 |
| 4,380,424 | A | * | 4/1983 | Skoch et al. ................ 425/331 |
| 5,009,586 | A | * | 4/1991 | Pallmann .................... 425/331 |
| 5,393,473 | A | | 2/1995 | Payer et al. |
| 5,585,180 | A | * | 12/1996 | Fadell ....................... 264/117 |
| 5,709,885 | A | | 1/1998 | Hellén et al. |

FOREIGN PATENT DOCUMENTS

AU          19605/88          1/1989

OTHER PUBLICATIONS

Derwent Abstract Acc. No. 97/047017/O5, JP, A, 08300348 (Nippon Recycle Management KK) Apr. 28, 1995.
Derwent Abstract Acc. No. 96–482007/48, JP, A, 08245247 (Meiji Gaishi KK) Mar. 7, 1995.

* cited by examiner

Primary Examiner—Stephen J. Lechert, Jr.
(74) Attorney, Agent, or Firm—Dilworth & Barrese LLP

(57) ABSTRACT

A granulator comprising a perforate screen located within a housing, a roller having a curved convex outer surface wherein the roller is pivotable relative to the screen so that in operation plastic material is able to be forced through the perforate screen by the roller surface so the roller pivots. The granulator is useful for wet and dry granulation.

18 Claims, 1 Drawing Sheet

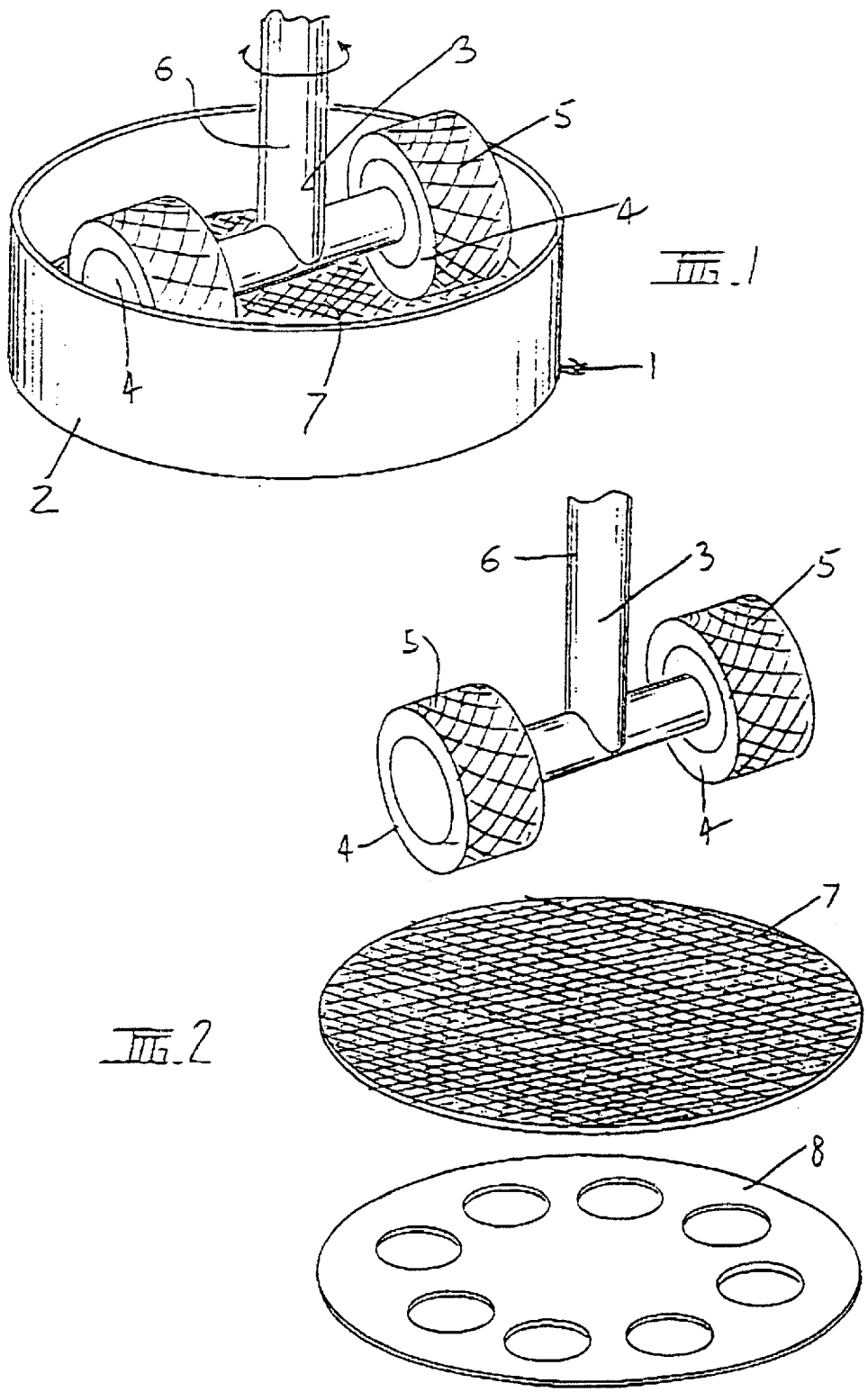

METHOD OF MAKING GRANULES AND THE GRANULATOR

FIELD AND BACKGROUND OF THE INVENTION

This invention relates to granulators used for or as part of a process for reducing the size of materials to form granules. Granules are widely used in the food, cleaning detergent, mineral processing, agrochemical and pharmaceutical industries. In many applications they offer significant advantages over other types of formulations. For example, they are typically low dusting and also offer advantages of ease of clean up of spills.

Granules may be prepared using a number of methods including agglomeration, spray drying and size reduction.

The term granulator is applied generally to equipment that may be used to produce granules. However, more particularly it is usually used to refer to special equipment specifically designed or modified for producing granules.

In the pharmaceutical industry granulation is a standard step that precedes tabletting. In practice in the pharmaceutical industry, it has been found that it is difficult to obtain accurately metered amounts of finely divided materials into a tablet die, because of the inconsistent flow characteristics of finely divided materials. To overcome this problem the finely divided materials are first converted to granules. Forming tablets from granules also tends to improve the integrity of the tablets. One method of forming granules that can be used is first to form a wet mix of the finely divided materials with water and then to extrude this damp plastic wet mix using an extruder. The extrudate is then dried to form a friable dry extrudate which can then be reduced to the final granule size by cutting or fragmentation. Equipment that can be used for both the extrusion stage and the cutting or fragmentation stage are the Manesty Rotorgran or the Jackson-Crockatt granulators.

The granules thus formed are then fed to the tablet die, enabling tablets of uniform mass to be prepared because of the more accurate metering and flow characteristics of granules. These tablets also exhibit improved integrity.

In the pharmaceutical industry granules may also be prepared by a size enlargement process whereby finely divided materials are agglomerated by tumbling the materials in the presence of a mist of water and optional binders. This process can be carried out using a pan granulator, fluidised bed apparatus or a tumbler. More recently new methods have been proposed for forming drug containing pellets. In U.S. Pat. No. 5,709,885 a method of preparing pellets is proposed that involves aggregation of finely divided materials to form a granulate, extrusion of the granulate into strands and then spheronization of these strands.

Granulation processes suitable for the pharmaceutical industry may also be used in the agrochemical industry to prepare granules containing pesticides or other agrochemical active ingredients. Agrochemical granules are usually used by the farmer by adding the granules to water allowing dissolution/dispersion of the granule to enable application of the active ingredient to target species by spray application. This class of granules is usually referred to as water dispersible granules (WG) but can be regarded as including water soluble granules as well as granules intended for direct application to soil or other loci.

In the agrochemical industry such granules have represented a major formulation breakthrough allowing easier handling, metering and clean-up of spillage.

One method of preparing WG granules is described in Australian Patent Application No. 606,719 where a wet mix is first formed with defined ingredients. The wet mix is then extruded, typically using a Manesty Rotorgran or Jackson-Crockatt type granulator having a woven wire mesh screen or a punched plate screen made out of stainless steel. The aperture size of the screen may be varied but is typically in the range of 0.5–2.0 mm. The damp extrudate that emerges from the screen has a diameter similar to that of the screen aperture size. This damp extrudate is then broken down in size to granules by a tumbling action. The tumbling action may be imparted to the extrudate using a tumbler rotating about its usual horizontal or inclined axis or by using a fluidised bed apparatus. The tumbling action causes a cascading motion resulting in shear mixing as extrudate cascades over other extrudate, resulting in the break down of extrudate to form granules. These granules typically have low compactness and redisperse readily. While WG granules prepared using the above described process have been successfully commercialized, the rate limiting step in the production process has been found to be the extrusion stage.

The Manesty Rotorgran includes a curved grid or screen of aperture size that may be varied but which is typically approximately 1 mm. Mounted above and in close proximity to the surface of this screen are reciprocating blades attached to a rotor assembly. They are arranged and operate so that the edges of the blades sweep in a reciprocating scraping action against the tensioned screen as the rotor assembly rotates backwards and forwards. In operation, material is placed into the Manesty Rotorgran from above to contact the screen and is swept by the blades. When the material is friable the sweeping action of the blades over the screen causes the material to be fractured and broken down in size. This size reduction process continues until the broken down material is small enough to pass through the screen apertures. Accordingly, this apparatus when used with coarse friable material provides a material size reduction process as well as a sizing process. This granulator may also be used for size reduction when the material is deformable or plastic. In this case the sweeping scraping action of the blade causes the plastic material to be compressed and forced through the screen, thus forming extrudate strands of approximately the same diameter as the screen openings. This latter process with plastic materials can also be described as an extrusion process and such a process is regarded as a size reduction process as the plastic material is reduced in size to extrudate. Usually the extrudate is further reduced in size to form granules. This can be done by first drying the extrudate or by size reduction while the extrudate is still damp and plastic.

An alternative granulator to the Manesty Rotorgran is the Jackson-Crockatt granulator. This apparatus operates on a similar principle to the Manesty Rotorgran but instead of using a sweeping blade action over a curved screen uses a reciprocating rotational action applied to the blade so that the blade rotates about a vertical axis at the mid point of the length of the blades. The blades are arranged to be in close proximity to a flat horizontal screen. In the Jackson-Crockatt equipment the effective speed of the blade increases as the distance from the rotational axis increases. In common with the Manesty Rotorgran the material has a sweeping action applied by the blades.

In both the Manesty Rotorgran and the Jackson-Crockatt granulators, in use, pressure is applied between blade edge and the screen. In practice, in combination with the sweeping action, this causes frictional wear on the screen and the blade edge. This is particularly the case when used with damp plastic materials that contain abrasive mineral extenders. This is often the case with agrochemical WG formulations. This pressure requirement also means adjustment to provide uniform pressure across the working area is difficult as the characteristics of the plastic material may change from batch to batch and also with temperature. In the case of the Jackson-Crockatt apparatus with the reciprocating rotating blade, if the diameter of the screen and area of the working surface is increased to increase productivity, the tip speed of the blade is increased which can lead to difficulties in satisfactory operation. For example, it is more difficult to achieve satisfactory alignment of the blade and screen. Furthermore, because of higher tip speeds heat build up can cause problems. Accordingly it is not practical to increase the diameter to the extent desired and as set out above the granulator is usually the rate limiting step in granulation processes. This is usually not a difficulty in the pharmaceutical industry where relatively small amounts of material are required to be processed. However in the agrochemical industry where larger quantities of granules are required to be processed, this can be a major problem. Furthermore, as mentioned above, the screen can wear and become damaged leading to unacceptably coarser extrudate being formed and the manufacturing process having to be interrupted and the screen replaced with obvious production and cost penalties. Other types of granulators have been used and these include Fuji Paudal basket granulators and Hosokawa Schugi Bextruder granulators.

Granulators or pellitisers are known where compaction and formation of granules or pellets takes place primarily in the base plate. For example, in the patent of Payer et al (U.S. Pat. No. 5,393,473) a method of extrusion agglomeration of ultra-high molecular weight polyethylene is disclosed. In the Payer process precompacted powder "is pushed into the compression channels of the pan . . . " (column 2, lines 22–24). To achieve agglomeration and melting in the compression channels it is a requirement that the compression ratio which is the ratio of the diameter to length of the compression channel is in the range 1:5 to 1:15 and preferably 1:8 to 1:12 (see column 2, lines 63–68). The compression ratio in the Payer invention is well illustrated in FIG. 1 and Examples 1 to 3 are prepared using this equipment. The compression channel also has an initial tapered portion to aid compaction.

Derwent Abstract 97-04107/05 (Nippon Recycle management KK) discloses apparatus that is similar to that of Payer et al. In particular if one refers to the drawing it is apparent that the "compression ratio" of the die in the base plate is at least 5:1. Furthermore, it appears the lower portion of the die is narrower than the upper portion, again similar to the Payer citation.

SUMMARY OF THE INVENTION

This invention provides in one form a granulator comprising a thin perforate screen located within a housing, a roller having a curved convex outer surface and located within the housing wherein the roller is adapted to pivot relative to the perforate screen so that in operation plastic material is able to be forced through the perforate screen by the roller surface as the roller pivots.

Preferably the roller pivots about an axis that is generally parallel to the screen and wherein the roller is further adapted to provide, in operation downward pressure on the screen and, in operation compress plastic material between the curved outer surface of the roller and the screen so that plastic material is forced through the perforations as the roller pivots.

Preferably the roller is further adapted to pivot about an axis generally perpendicular to the screen surface and inboard of the roller so that in operation the curved outer surface of the roller contacts the upper surface of the screen and describes an annular pathway about the inboard axis as the roller pivots about its generally parallel axis when the roller pivots about the inboard generally perpendicular axis.

Preferably the curved outer surface is of generally cylindrical shape.

Preferably the perforate screen is generally flat.

In an alternative form this invention provides a method of preparing granular products comprising forming an extrudable plastic wet mix of active ingredient water and optional fillers, extruding the wet mix using a granulator as described above.

Preferably the granular products are water dispersible granules for agricultural use.

DETAILED DESCRIPTION OF THE INVENTION

The roller may be in the form of a cylinder that is rotatable about its longitudinal axis. An example of such a roller is a wheel where the circumferential tread surface is generally smooth. The surface may also be textured or indented. The surface of the roller may be made from relatively non deformable materials such as steel or rigid plastic material. Alternatively it may be made from deformable materials such as rubber, plastic, or pneumatic materials. The roller may also be simply an arcuate segment of such a cylinder. It is important for the working of the present invention that the outer surface is curved in a convex form. While a cylinder is a suitable shape for the roller when the screen is flat, the roller could also have a spherical shape provided the screen provided a complementary shape to allow the surfaces to come into close proximity as the roller pivots or rotates. Thus, in the case of a sphere, the surface would need to have a recess of part circular cross-sectional shape to accommodate the sphere. The support structure for the outer surface is not critical and spokes could be used as the support. It is also not essential for the roller to be a cylinder or a segment of a cylinder and alternative curved convex rollers can be used, provided in operation they can compress the material between the outer surface of the roller and the screen surface as the roller pivots. Accordingly an outer surface of a parabolic form could be used. The support structure for the outer surface can be of any convenient form, including the spokes mentioned above.

The purpose and function of the housing is simply to contain the material while it is broken down and a variety of shapes are able to be used. A generally cylindrical housing is convenient and avoids dead spots where material may be accumulated and not processed satisfactorily.

The roller, as well as being pivotable or rotatable about its longitudinal axis, is preferably also pivotable or rotatable about an inboard generally vertical axis inwardly disposed from the roller. While in this description the axes are described as generally horizontal and vertical, it will be appreciated that by appropriate linkages the drive means to the roller could be angled to the horizontal or to the vertical to achieve a similar result and these variations come within the scope of the present invention. Furthermore, it will be appreciated that the terms horizontal and vertical relate to the orientation of the granulator in normal use. However, it is possible for substantial changes in such orientation to occur in practice without effecting the principle of operation of the granulator and such variations come within the scope of the present invention.

In use, material is added to the housing above the screen and the material is compressed between the screen surface and the roller surface, which roller is caused to rotate about its longitudinal axis by frictional contact between the tread of the roller and the screen and/or material between the tread and the screen as the roller pivots or rotates about the generally vertical inboard axis.

Preferably the roller consists of two or more wheels rotatable about a central axis perpendicular to these axes.

The vertical axis of rotation, while preferably central, may be partially offset in which case two or more annular pathways are described which pathways may partially overlap.

A drive shaft does not necessarily need to be located at the vertical axis of rotation and alternative drive mechanisms may be used such that rotation or pivoting occurs about the vertical axis of rotation despite the absence of a drive shaft at this point. Preferred granulators however have drive shafts at this vertical axis. Within the scope of the present invention are wheels or cylinders that have independent drive or rotation means.

In operation downward pressure on the screen surface is applied by the roller by having the roller mounted such that vertical movement is restricted. This is conveniently achieved by having the inboard rotational shaft connected to a gear box or chuck of a drive mechanism. Usually the drive mechanism is via a variable speed electric motor or a hydraulic drive mechanism. Other methods of applying downward pressure may be used such as springs or hydraulic pressure.

The screen may be in the form of a woven wire mesh or a punched plate, or other suitable perforated screen. These are usually made of stainless steel but may be made also from plastic or other metals. When the screen is in the form of a mesh or a thin punched plate a supporting base plate is required to be located below the screen to prevent undue flexing and distortion of the mesh or plate. The supporting plate can take the form of a stainless steel plate with an annular array of holes, typically 10–20 mm in diameter to allow broken down material or extrudate to exit from the granulator. While in preferred embodiments the screen is flat, it is possible for the screen to be substantially curved as in the Manesty Rotorgran. In this case a reciprocating action by the roller would be preferred.

Suitable types of wire mesh screens or punched plates are well known in the engineering field and are generally described in standard handbooks such as Chemical Engineer's Handbook by Perry. As described above, the aperture size of the screen may be varied but it is typically in the range of 0.5–2.0 mm. in diameter and the diameter determines the approximate diameter of extrudate. As set out in Perry, the maximum thickness of punched plates is determined by the diameter of the holes and for 1 mm. diameter holes is 0.6 mm and for 2 mm. diameter holes is 1.2 mm.

According to Perry, thinner plates than these may be used at a lower cost. In the case of standard woven wire screen used as sieves, when the aperture is 1 mm., the wire thickness is approximately 0.5 mm. When the aperture is 2 mm. the wire thickness is approximately 0.75 mm. Generally, the thickness of the plate or screen is less than double the diameter and more usually less than the diameter. The plate or screen is thin.

The wire diameter can be varied with the same aperture and with increased diameter wire the screens have longer life but have lower through put per unit area. For a diameter of aperture of approximately 0.8 mm., the wire diameter generally available ranges from 0.25 mm to 1.0 mm.

It is also possible to adapt a Fuji Paudal type basket granulator which has a cylindrical screen by replacing the sweeping blades with cylindrical rollers. Similarly a Bextruder can be adapted by appropriate replacement of the blades with rollers. In both these cases the normal operation of the rollers would be in a non reciprocating action.

In certain embodiments of this invention the roller is shaped and/or its mode of operation is adapted so as to provide a mulling action over the working area between the outer surface of the roller and the screen.

A mulling action is a smearing spatulate action.

In the granulator of the present invention this mulling action may be obtained by rotation of the roller about the inboard generally vertical axis provided the roller is appropriately shaped. When the roller is in the form of a wheel or a treaded wheel of uniform diameter across its width the track describes an annular pathway. The inner circumference of the pathway is smaller than that of the outer circumference of the pathway. This difference in pathway distance leads to the smearing spatulate effect which provides particularly effective and efficient operation of the granulator for certain formulations. The smearing or mulling effect results from some forced slippage as the inner portion of the wheel or treaded wheel has the same circumferential movement as the outer portion but is constrained to move over a shorter pathway distance.

The amount of mulling can be increased by increasing the width of the tread on the wheel. It may also be varied by changing the inner and outer diameters of the treaded wheel. If the inner diameter is decreased such that its inner and outer circumferences both match the track distance traveled by both portions of the roller surface there will be no mulling effect. Again this may be desirable for certain formulations. The amount of mulling can be adjusted between these two amounts by appropriate adjustment of the two diameters. The mulling effect can also be increased over that obtained with a uniform cylindrical roller by increasing the diameter of the inner diameter while maintaining the outer diameter the same. The mulling effect can be increased even further by decreasing the outer diameter of the wheel as well as increasing the inner diameter.

As an example of the mulling effect, its quantification and how it may be varied, the following calculations are provided by way of illustration.

In this example the roller is cylindrical and its tread has width 20 mm, inner and outer, diameters of 40 mm and the radius of rotation about its inboard axis is 30 mm to the inner circumference of the tread and 50 mm to the outer circumference of the tread. In this example the pathway distance of the inner circumference of the track is 60 mm. The pathway distance of the outer circumference of the track is 100 mm. The mulling effect can be regarded as the relative percentage of these namely $$\left[\left(\frac{100\pi}{60\pi}\right) \times 100\right] - 100 = 67\%$$

If the inner diameter of the roller is decreased so that there is a general inwards taper with the inner diameter being 24 mm, and the outer remaining at 40 mm, the mulling effect would be reduced by the relative diameters $$\left[\left(\frac{100\pi}{60\pi}\right) \times \frac{24}{40} \times 100\right] - 100 = 0\%$$

If the inner diameter is changed to 32 mm while again maintaining the outer at 40 mm, the mulling effect is $$\left[\left(\frac{100\pi}{60\pi}\right) \times \frac{32}{40} \times 100\right] - 100 = 33\%$$

Conversely if the maximum inward taper from above of 40 mm to 24 mm was reversed to be an outward taper of 40 mm to 24 mm the mulling effect would be $$\left[\left(\frac{100\pi}{60\pi}\right) \times \frac{40}{24} \times 100\right] - 100 = 180\%$$

When the granulator is used to reduce the size of plastic material it is preferable that the granulator also provides some mixing of the material. We believe with certain formulations that the mulling effect has a beneficial effect on mixing as well as the efficient operation of the granulator. However, usually the materials are intimately mixed before addition to the granulator. In preferred embodiments the amount of material in the pathway of the roller is regulated by means of guides, preferably in the form of plough shaped tynes located ahead of the roller and adapted to control the amount of material directed into the pathway of the roller. This control over the amount of material located ahead of the roller can also be achieved using auxiliary rotating or oscillating blades as optionally used in known basket granulators.

While the granulator may be operated by continuous rotation about the inboard axis it may also be operating using a reciprocating action. For example, a forward pathway may be used for 80% of a circumference and then the direction of travel may be reversed to retrace the pathway. This reciprocating action can lead to greater throughput of plastic material and can avoid caking. While achieving good performance with such reciprocating action some unevenness in wear on the screen can occur because the circumferential pathway is not fully used. This problem is overcome by using a reciprocating action in which the forward and reverse pathways are unequal. For example, if the forward pathway is 80% of a revolution and the reverse pathway is 40% this ensures that in use the full pathway is used and that there is full utilization of the screen.

In practice we have found that the granulator of the present invention often provides substantially increased throughput and in some cases reduced screen wear. One of the reasons for the reduced screen wear compared to the Jackson-Crockatt granulator is that because of the annular tracking or working area, the screen can be supported in a manner so as to provide a relatively stable surface, allowing less flexing and wear of the screen. The action of the roller also reduces drag and friction compared to the shearing scraping action of prior art granulators. It is believed that the rolling action of the roller relative to screen is a more efficient means of forcing plastic material through the screen and can lead to higher throughput of product and less screen wear compared to prior art granulators. In some embodiments tensioning of the wire mesh screen is important for efficient operation. However, the amount of tensioning required for optimum results can be determined by relatively simple experimentation with a particular granulator and formulation.

It will be appreciated that as an alternative to pivoting or rotation about the generally vertical inboard axis, the roller may be rolled by reciprocating lateral movement. An example of such an alternative embodiment is a cylindrical roller that is rolled backwards and forwards across a screen. It will also be appreciated that in this alternative embodiment, the mulling effect could be achieved by having the roller tapering in diameter.

Within in the scope of the present invention is a granulator where the relative movement between the screen and the roller is achieved by rotation or movement of the screen whilst maintaining the roller stationary apart, of course, from rotation or pivoting of the roller.

Materials that can be dry or wet granulated using granulators according to the present invention can be selected from a wide range of materials. Active ingredients may include agrochemicals such as herbicides, insecticides, fungicides and fertilizers. Pharmaceutical active ingredients, food ingredients, detergent ingredients and mineral ingredients may, for example, be used The invention will be further described by reference to the following drawings:

BRIEF DESCRIPTION OF DRAWINGS

FIG. 1 is a perspective view of a granulator.

FIG. 2 is a perspective view of a granulator partially disassembled.

Referring to FIGS. 1 and 2 the granulator (1) consists of a cylindrical housing (2) of diameter 100 mm within which is located a roller (3) mounted on a stainless steel woven wire mesh screen (7). The roller (3) consists of a pair of wheels (4) with plastic treaded surfaces (5). The wheels (4) are free to rotate on stub axles that are attached to a vertical drive shaft (6). A circular supporting base plate (8) is shown with an annular arrangement of holes. The base plate (8) is located within the housing (2) by means of an annular ledge (not shown) on the housing. The vertical drive shaft (6) is rotated in a reciprocating fashion at a variable speed. Speeds of rotation between 50–300 rpm are suitable. Optimum speed may be readily ascertained by simple experimentation with a particular material to be granulated.

In operation, plastic material is added to the housing (1) as the drive shaft rotates in a reciprocating fashion. Frictional contact between the tread (5) of the wheels (4) and the screen (7) causes the wheels (4) to pivot and rotate and exert downward pressure on the material between the tread and the screen causing extrudate to emerge below the screen (7).

The granulator may also be used to reduce the size of friable material. In this case friable material is broken down by the action of the tread of the rotating or pivoting roller and the screen.

The invention will be further described by reference to preferred embodiments in the following examples:

EXAMPLE 1

This illustrates the preparation of water dispersible granules using a granulator according to the invention to extrudate a plastic wet mix. The granules contain 90% simazine as active ingredient.

A 5 kg dry blend of the following ingredient was prepared:

| Ingredient | % w/w |
| --- | --- |
| Simazine (Technical) | 91.84 |
| Dispersant (Polycarboxylic acid/ polyarylphenol ethoxylated sulfate, ammonium salt) | 3.00 |
| Wetting Agent (sulfate of alkyl carboxylate and sulphonated alkyl naphthalene, sodium salt) | 3.00 |
| Talc | 1.66 |
| Residual Water | 0.50 |

Wet sieve and particulate size distribution analyses were carried out on the technical grade simazine giving the following results:

Wet Sieve Analysis % retained cumulative:
150 $\mu$m - 0.01
45 $\mu$m - 0.16

| Particle size distribution analyses (Malvern "Mastersizer" 45 mm lens) | | | |
| --- | --- | --- | --- |
| d(0.9) | d(0.1) | d(0.5) | D[4,3] |
| 20.7 $\mu$m | 0.66 $\mu$m | 6.96 $\mu$m | 9.48 $\mu$m |

950 g water was added to the 5 kg batch of dry pre-mix and the mixture blended for 5 minutes to produce a wet mix.

The wet mix was passed through a 200 mm diameter granulator. The granulator was modified from a No. 7 Jackson Crockatt granulator fitted with a 910 $\mu$m aperture stainless steel woven wire mesh tensioned over a perforated steel base plate. The perforations in the steel base plate reduced the available mesh area for extrusions by a factor of 4.3. The standard Jackson Crockatt 3 blade rotor was replaced with 4 steel rollers each 38 mm in diameter by 30 mm wide with a smooth surface. The rollers were supported by steel shafts affixed at right angles to a vertical reciprocating shaft and offset at 15 degrees to same to produce a mulling effect The shaft reciprocated approximately 70% of a fall rotation at a speed of five reciprocations per minute. Vertical steel guiding blades were position 10 mm from the inner edge of each roller, 2 mm above the base of each roller to assist distribution of the wet mix into the path of the rollers.

The vertical shaft was adjusted so that the rollers were lightly tensioned against the mesh.

The wet mix was delivered to the vertical cylindrical hopper of the granulator whilst the unit was in operation and maintained at a level approximately 75% of the height of the rollers.

The wet mix extruded very well at a rapid rate. Wet extrudates were rolled in an inclined open mouth rotating bowl for 30 seconds after which time they had reduced to evenly sized smooth granules which were dried at 45° C. 94.4% of the dry granules by weight were in the size range of 0.5–1.7 mm. The extrusion rate was 57 kg/Hr and the extrusion rate per 1000 mm$^2$ of exposed mesh was 15.1 kg/Hr.

EXAMPLE 2

This is a comparative example that illustrates extrusions using a commercial granulator.

5 kg of a wet simazine mix identical to that described in Example 1 was prepared and passed through a No. 7 Jackson Crockatt granulator but in its unmodified configuration. It was fitted with the same 910 $\mu$m aperture mesh and base plate used for Example 1 but the standard 3 blade Jackson Crockatt rotor replaced the rollers used in the granulator of Example 1. The extent and speed of reciprocation were the same as that of Example 1.

The wet mix was extruded satisfactorily and was converted to granules in accordance with the method described in Example 1. 95.4% of the dry granules by weight were in the size range of 0.5–1.7 mm. The extrusion rate was 54 kg/Hr and the rate per 1000 mm$^2$ of exposed mesh was 3.3 kg/Hr which is significantly less than the rate in Example 1.

EXAMPLE 3

This Example illustrates the granulation of sodium lauryl sulfate detergent using a laboratory scale model of a granulator according to the invention.

A laboratory granulator was manufactured to be similar to the unit described in Example 1. It was made from stainless steel and consisted of a vertical cylindrical hopper of 75 mm internal diameter with 3 steel rollers, each 37 mm in diameter with a 12 mm wide smooth surface. The rollers were positioned an equal distance apart on steel support rods fixed at right angles to a reciprocating vertical shaft.

Granular sodium lauryl sulfate (Zoharpon SLS brand) was used.

A dry sieve analysis was carried out on the material as received, results as follows:

| Sieve Aperture | % w/w retained cumulative |
| --- | --- |
| 2400 $\mu$m | 53.08 (some up to 10 mm) |
| 1700 $\mu$m | 62.58 |
| 1180 $\mu$m | 69.27 |
| 850 $\mu$m | 75.24 |
| 425 $\mu$m | 88.66 |
| 150 $\mu$m | 98.23 |

The detergent was first dry granulated adding it to the laboratory granulator fitted with a 910 $\mu$m aperture woven stainless steel wire mesh tensioned over a perforated base plate. The roller assembly was adjusted so that the rollers were lightly tensioned on the mesh. The drive shaft reciprocated approximately 70% of a full rotation and the speed was set at 150 reciprocations per minute. Although the sodium lauryl sulfate was not particularly frangible and possessed slightly sticky "soap" like characteristics, it passed through the laboratory granulator rapidly, resulting in the production of a slightly sticky coarse granular powder. A dry sieve analysis was carried out on the powder giving the following results.

| Sieve Aperture | % w/w retained cumulative |
| --- | --- |
| 850 $\mu$m | 6.70 |
| 425 $\mu$m | 47.05 |
| 300 $\mu$m | 66.20 |
| 212 $\mu$m | 78.90 |
| 150 $\mu$m | 90.66 |

200 g of this powder was blended with 13.4 g of water to produce a wet mix which was processed in the laboratory at the same settings used for dry granulation to result in cohesive extrudates approximately 5–30 mm in length. The wet mix was extruded without difficulty at a fast rate.

The wet extrudates were rolled/tumbled vigorously by hand in an inflated polyethylene bag for 90 seconds to reduce them to smooth, evenly sized cylindrical granules. After drying at 45° C., 98.3% of the granules by weight were in the size range of 0.5–1.7 mm.

EXAMPLE 4

This Example illustrates the wet granulation of a commercial laundry detergent composition.

"Cold Power" distributed by Colgate-Palmolive Pty Ltd, was used.

A dry sieve analysis was carried out on a sample of "Cold Power" powder with the following results:

| Sieve Aperture | % w/w retained cumulative |
| --- | --- |
| 850 µm | 0.3 |
| 425 µm | 24.1 |
| 300 µm | 51.7 |
| 212 µm | 78.8 |
| 150 µm | 94.5 |

A wet mix was prepared by blending 200 g of "Cold Power" with 5 g of water. This was passed through the laboratory granulator described in Example 3. This was set up and operated in the same manner as described under Example 3. The wet mix extruded satisfactorily to produce cohesive extrudates, generally 2–4 mm in length. More energy was required to extrude the "Cold Power" pre-mix than the sodium lauryl sulfate pre-mix of Example 3.

The wet extrudates were rolled/tumbled vigorously for 120 seconds by hand in an inflated polyethylene bag which reduced them to reasonably smooth elongated granules. After drying at 45° C., 95.7% of the granules by weight were in the size range of 0.5–1.7 mm.

EXAMPLE 5

This Example illustrates the formation of granules containing trace elements.

"Librate B-Z", a trace element composition manufactured by Bilton Hutchinson Limited, UK was used for granulation via the laboratory granulator of Example 3.

This product was in the form of a coarse powder and stated to comprise copper, iron, zinc and manganese chelates plus boron and molybdenum in a non-chelated form.

A dry sieve analysis was carried out on the "Librate-B-Z" powder, giving the following results:

| Sieve Aperture | % w/w retained cumulative |
| --- | --- |
| 850 µm | 9.6 |
| 425 µm | 47.0 |
| 300 µm | 60.7 |
| 212 µm | 72.9 |
| 150 µm | 82.3 |

A wet mix was prepared by blending 200 g of "Librate B-Z" powder with 12.5 g of water and this was processed through the laboratory granulator to produce cohesive extrudates 5–30 mm in length. The granulator was set up and operated in the same manner as described in Example 3 except a woven sunless steel wire mesh with an aperture of 2.0 mm was used.

The wet extrudates were rolled gently by hand for 30 seconds within an inflated polyethylene bag to form reasonably smooth large granules. After drying at 45° C., 92.6% of the granules by weight were within the 1.7 mm–3.9 mm size range.

EXAMPLE 6

This Example illustrates the preparation of talc granules using a granulator according to the present invention.

5 kg batch granulation trials were carried out with the following pre-mix to compare production rates via the granulator of Example 1 and No. 7 Jackson-Crockatt configurations used in Example 2.

| Ingredient | w/w |
| --- | --- |
| Talc | 90.0 |
| Morwet D425 | 7.6 |
| Morwet EFW | 1.9 |
| Residual Water | 0.5 |

The above ingredients were blended dry and then formed into a wet mix with water at the rate of 20 g per 100 g dry mix. This wet mix was passed through the granulator set up and operated in the manner as described in Example 1.

The 5 kg batch (dry basis) extruded very well at a fast rate and the extrudates were rolled for 30 seconds in an inclined open mouth rotating bowl to produce smooth evenly sized granules. After drying at 45–50° C., 94.6% of the granules by weight were in the size range of 0.5–1.7 mm. The extrusion rate was 281 kg/Hr and 74.7 kg/Hr per 1000 mm$^2$ exposed mesh.

EXAMPLE 7

This is a comparative example that illustrates the lower rate of extrusion for the composition of Example 6 when granulated using a commercial Jackson-Crockatt granulator.

The wet mix of Example 6 was extruded using the granulator and set up of Example 2.

The 5 kg batch (dry basis) extruded satisfactorily but at a much slower rate than in Example 6.

The extrudates were rolled in the manner described in Example 6 to produce smooth evenly sized granules. After drying at 45–50° C., 95.1% of the granules by weight were in the size range of 0.5–1.7 mm.

The extrusion rate was 93 kg/Hr and 5.7 kg/Hr per 1000 mm$^2$ exposed mesh.

The consumption of energy as determined by the kilowatts used was substantially more than for Example 6. The rate of energy consumption was essentially the same as in Examples 6 and 7.

It will be appreciated that the invention described herein is susceptible to variations and modifications other can those specifically described. It is to be understood that the invention encompasses all such variations and modifications that fall within its spirit and scope.

What is claimed is:

1. A granulator comprising a perforate screen located within a housing, a roller having a curved convex outer surface and located within the housing wherein the roller is adapted to pivot relative to the perforate screen so that in operation, plastic material is able to be forced through the perforate screen by the roller surface as the roller pivots, wherein the thickness of the perforate screen is less than twice the diameter of a perforation therethrough.

2. A granulator as defined in claim 1 wherein the roller pivots about an axis that is generally parallel to the screen and wherein the roller is further adapted to provide, in operation, downward pressure on the screen and, in operation, compress plastic material between the curved outer surface of the roller and the screen so that plastic material is forced through the perforations as the roller pivots.

3. A granulator as defined in claim 2, wherein the curved outer surface is of a generally cylindrical shape.

4. A granulator as defined in claim 2, wherein the roller is adapted to pivot about an axis generally perpendicular to the screen surface and inboard of the roller, so that in operation, the curved outer surface of the roller contacts the upper surface of the screen and describes an annular pathway about the inboard axis as the roller pivots about its generally parallel axis when the roller pivots about the inboard generally perpendicular axis.

5. A granulator as defined in claim 2 wherein the roller consists of two or more wheels rotatable about their axes and also about a central axis perpendicular to these axes.

6. A granulator as defined in claim 2, wherein the roller is adapted to exert a mulling effect before the material is forced through the screen perforations.

7. A granulator as defined in claim 1 wherein the curved outer surface is of generally cylindrical shape.

8. A granulator as defined in claim 7, wherein the roller is adapted to pivot about an axis generally perpendicular to the screen surface and inboard of the roller, so that in operation, the curved outer surface of the roller contacts the upper surface of the screen and describes an annular pathway about the inboard axis as the roller pivots about its generally parallel axis when the roller pivots about the inboard generally perpendicular axis.

9. A granulator as defined in claim 7 wherein the roller consists of two or more wheels rotatable about their axes and also about a central axis perpendicular to these axes.

10. A granulator as defined in claim 7, wherein the roller is adapted to exert a mulling effect before the material is forced through the screen perforations.

11. A granulator as defined in claim 1 wherein the roller is adapted to pivot about an axis generally perpendicular to the screen surface and inboard of the roller so that in operation the curved outer surface of the roller contacts the upper surface of the screen and describes an annular pathway about the inboard axis as the roller pivots about its generally parallel axis when the roller pivots about the inboard generally perpendicular axis.

12. A granulator as defined in claim 11 wherein the roller consists of two or more wheels rotatable about their axes and also about a central axis perpendicular to these axes.

13. A granulator as defined in claim 11, wherein the roller is adapted to exert a mulling effect before the material is forced through the screen perforations.

14. A granulator as defined in claim 1 wherein the roller consists of two or more wheels rotatable about their axes and also about a central axis perpendicular to these axes.

15. A granulator as defined in claim 14, wherein the roller is adapted to exert a mulling effect before the material is forced through the screen perforations.

16. A granulator as defined in claim 1 wherein the roller is adapted to exert a mulling effect before the material is forced through the screen perforations.

17. A method of extruding plastic material by forcing the material between a perforate screen located within a housing and a curved convex outer surface of a roller located within the housing by pivoting the roller relative to the perforate screen.

18. A method of forming water dispersible granules by forming a wet mix of ingredients, extruding the wet mix into extrudates in a granulator having a roller with curved convex outer surface and a perforate screen by pivoting the roller relative to the screen thereby forcing the wet mix into extrudate, rolling the extrudate in a tumbling action to break down the extrudate into granules and optionally drying the granules.

* * * * *